(12) United States Patent
Nahvi

(10) Patent No.: US 12,306,785 B2
(45) Date of Patent: *May 20, 2025

(54) TECHNIQUES FOR DECONFLICTING USB TRAFFIC IN AN EXTENSION ENVIRONMENT

(71) Applicant: Icron Technologies Corporation, Burnaby (CA)

(72) Inventor: Mohsen Nahvi, City of North Vancouver (CA)

(73) Assignee: Icron Technologies Corporation, Burnaby (CA)

( * ) Notice: Subject to any disclaimer, the term of this patent is extended or adjusted under 35 U.S.C. 154(b) by 83 days.

This patent is subject to a terminal disclaimer.

(21) Appl. No.: 18/330,250

(22) Filed: Jun. 6, 2023

(65) Prior Publication Data

US 2023/0315675 A1 Oct. 5, 2023

Related U.S. Application Data

(63) Continuation of application No. 17/476,293, filed on Sep. 15, 2021, now Pat. No. 11,709,791.

(60) Provisional application No. 63/080,968, filed on Sep. 21, 2020.

(51) Int. Cl.
  *G06F 13/42* (2006.01)
  *G06F 13/24* (2006.01)
  *G06F 13/38* (2006.01)

(52) U.S. Cl.
  CPC ......... *G06F 13/4282* (2013.01); *G06F 13/24* (2013.01); *G06F 13/385* (2013.01)

(58) Field of Classification Search
  CPC ..... G06F 13/4282; G06F 13/24; G06F 13/385
  See application file for complete search history.

(56) References Cited

U.S. PATENT DOCUMENTS

| 7,177,973 B2 | 2/2007 | Jackson |
| 7,409,485 B1 * | 8/2008 | Sartin .................. G06F 13/128 710/305 |
| 9,798,377 B2 * | 10/2017 | Sanghi ............... G06F 13/4282 |
| 10,037,297 B2 | 7/2018 | Li |
| 10,552,355 B2 | 2/2020 | Hundal et al. |
| 2002/0078283 A1 | 6/2002 | Purcell |

(Continued)

*Primary Examiner* — Henry Tsai
*Assistant Examiner* — Harry Z Wang
(74) *Attorney, Agent, or Firm* — Knobbe, Martens Olson & Bear, LLP

(57) ABSTRACT

In some embodiments, a system is provided for communicating USB information via an extension medium. The system comprises an upstream facing port device (UFP device) and a downstream facing port device (DFP device). The UFP device and the DFP device are communicatively coupled via a non-USB extension medium, and allow a host device communicatively coupled to the UFP device and a USB device communicatively coupled to the DFP device to communicate via USB-compliant techniques. In some embodiments, the DFP device generates synthetic request packets to request additional data packets from the USB device compared to those requested by the host device. In some embodiments, the DFP device is configured to store a request packet in a packet queue if the request packet is received from the UFP device while the DFP device is busy receiving a response to a previous synthetic request packet from the USB device.

17 Claims, 11 Drawing Sheets

(56) References Cited

U.S. PATENT DOCUMENTS

| | | |
|---|---|---|
| 2004/0177197 A1 | 9/2004 | McLeod |
| 2008/0162737 A1* | 7/2008 | Liu ..................... G06F 3/0613 |
| | | 710/8 |
| 2009/0193422 A1 | 7/2009 | Hsieh |
| 2011/0022743 A1 | 1/2011 | Liu |
| 2011/0022769 A1 | 1/2011 | Hung |
| 2011/0225328 A1* | 9/2011 | Ulenas ................ G06F 13/4045 |
| | | 710/58 |
| 2012/0117278 A1 | 5/2012 | Salamon |
| 2013/0282907 A1* | 10/2013 | Kim ..................... H04L 41/08 |
| | | 709/226 |
| 2014/0372654 A1 | 12/2014 | Pelt |
| 2015/0370733 A1 | 12/2015 | Gerber |
| 2016/0246745 A1 | 8/2016 | Chiang |
| 2019/0102333 A1 | 4/2019 | Hundal |

\* cited by examiner

TECHNIQUES FOR DECONFLICTING USB TRAFFIC IN AN EXTENSION ENVIRONMENT

CROSS-REFERENCE TO RELATED APPLICATIONS

This application is a continuation of U.S. application Ser. No. 17/476,293, filed Sep. 15, 2021, which claims the benefit of Provisional Application No. 63/080,968, filed Sep. 21, 2020, the entire disclosures of which are hereby incorporated by reference herein for all purposes.

BACKGROUND

USB is a peripheral interface for attaching a wide variety of computing devices, such as personal computers, digital telephone lines, monitors, modems, mice, printers, scanners, game controllers, keyboards, storage devices, and/or the like. The specifications defining USB (e.g., Intel et al., Universal Serial Bus Specification, Revision 1.0, January 1996; updated as Revision 1.1 in September 1998; further updated as Revision 2.0 in April 2000; further updated as Revision 3.0 in November 2008; released as Universal Serial Bus 3.1 Specification Revision 1.0 in July 2013; released as Universal Serial Bus 3.2 Specification Revision 1.0 on Sep. 22, 2017, and subsequent updates and modifications—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

Under Revision 3.1 of the USB Specifications, SuperSpeed connections are provided that use a 5 Gbps (Gen 1) or 10 Gbps (Gen 2) signaling rate. Though the specification does not mandate any particular maximum cable length, in practical terms the timing mandates and signaling techniques require a regular copper cable used for a SuperSpeed connection between a host and a device to be at most 3 meters long to properly support the SuperSpeed connection. Therefore, a new method and apparatus are needed to optionally allow for extension of a SuperSpeed USB device to a greater distance from the host to which it is coupled, such that SuperSpeed USB packets may be propagated between the host and the USB device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for communicating USB information via an extension medium is provided. The system comprises an upstream facing port device (UFP device) and a downstream facing port device (DFP device). The UFP device is communicatively coupled to a host device via a USB-compliant connection. The DFP device is communicatively coupled to a USB device via a USB-compliant connection. The UFP device and the DFP device are communicatively coupled to each other via a non-USB extension medium. The DFP device is configured to receive, from the UFP device via the extension medium, a request packet, wherein the request packet is directed to a first endpoint and indicates a sequence number and a buffer count, and wherein the sequence number and the buffer count identify a first set of requested data packets; generate a synthetic request packet, wherein the synthetic request packet includes the sequence number and a synthetic buffer count, wherein the sequence number and the synthetic buffer count identify a second set of requested data packets that includes the first set of requested data packets and additional data packets; and transmit the synthetic request packet to the USB device.

In some embodiments, a method of enabling communication between a host device and at least one USB device via a non-USB extension medium is provided. A downstream facing port device (DFP device) receives, from an upstream facing port device (UFP device) via the non-USB extension medium, a request packet. The request packet is directed to a first endpoint and indicates a sequence number and a buffer count. The sequence number and the buffer count identify a first set of requested data packets. The DFP device generates a synthetic request packet. The synthetic request packet includes the sequence number and a synthetic buffer count. The sequence number and the synthetic buffer count identify a second set of requested data packets that includes the first set of requested data packets and additional data packets. The DFP device transmits the synthetic request packet to the USB device.

In some embodiments, a downstream facing port device (DFP device) is provided. The DFP device comprises a USB downstream-facing port configured to be communicatively coupled to one or more USB devices, and an extension interface configured to be communicatively coupled to an upstream facing port device (UFP device) via a non-USB extension medium. The DFP device is configured to receive, from a UFP device via the non-USB extension medium, a request packet, wherein the request packet is directed to a first endpoint and indicates a sequence number and a buffer count, and wherein the sequence number and the buffer count identify a first set of requested data packets; generate a synthetic request packet, wherein the synthetic request packet includes the sequence number and a synthetic buffer count, wherein the sequence number and the synthetic buffer count identify a second set of requested data packets that includes the first set of requested data packets and additional data packets; and transmit the synthetic request packet to the USB device.

In some embodiments, a system for communicating USB information via an extension medium is provided. The system comprises an upstream facing port device (UFP device) and a downstream facing port device (DFP device). The UFP device is communicatively coupled to a host device via a USB-compliant connection. The DFP device is communicatively coupled to a USB device via a USB-compliant connection. The UFP device and the DFP device are communicatively coupled to each other via a non-USB extension medium. The DFP device is configured to: receive, from the UFP device via the extension medium, a request packet, wherein the request packet is directed to a first endpoint; receive, from the UFP device via the extension medium, a second packet while receiving a response associated with the request packet from the first endpoint, wherein the second packet is directed to a second endpoint;

and store the second packet in a packet queue at least until receipt of the response associated with the request packet has completed.

In some embodiments, a downstream facing port device (DFP device) is provided. The DFP device comprises a USB downstream-facing port configured to be communicatively coupled to one or more USB devices, and an extension interface configured to be communicatively coupled to an upstream facing port device (UFP device) via a non-USB extension medium. The DFP device is configured to: receive, from a UFP device via an extension medium, a request packet, wherein the request packet is directed to a first endpoint; receive, from the UFP device via the extension medium, a second packet while receiving a response associated with the request packet from the first endpoint, wherein the second packet is directed to a second endpoint; and store the second packet in a packet queue at least until receipt of the response associated with the request packet has completed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
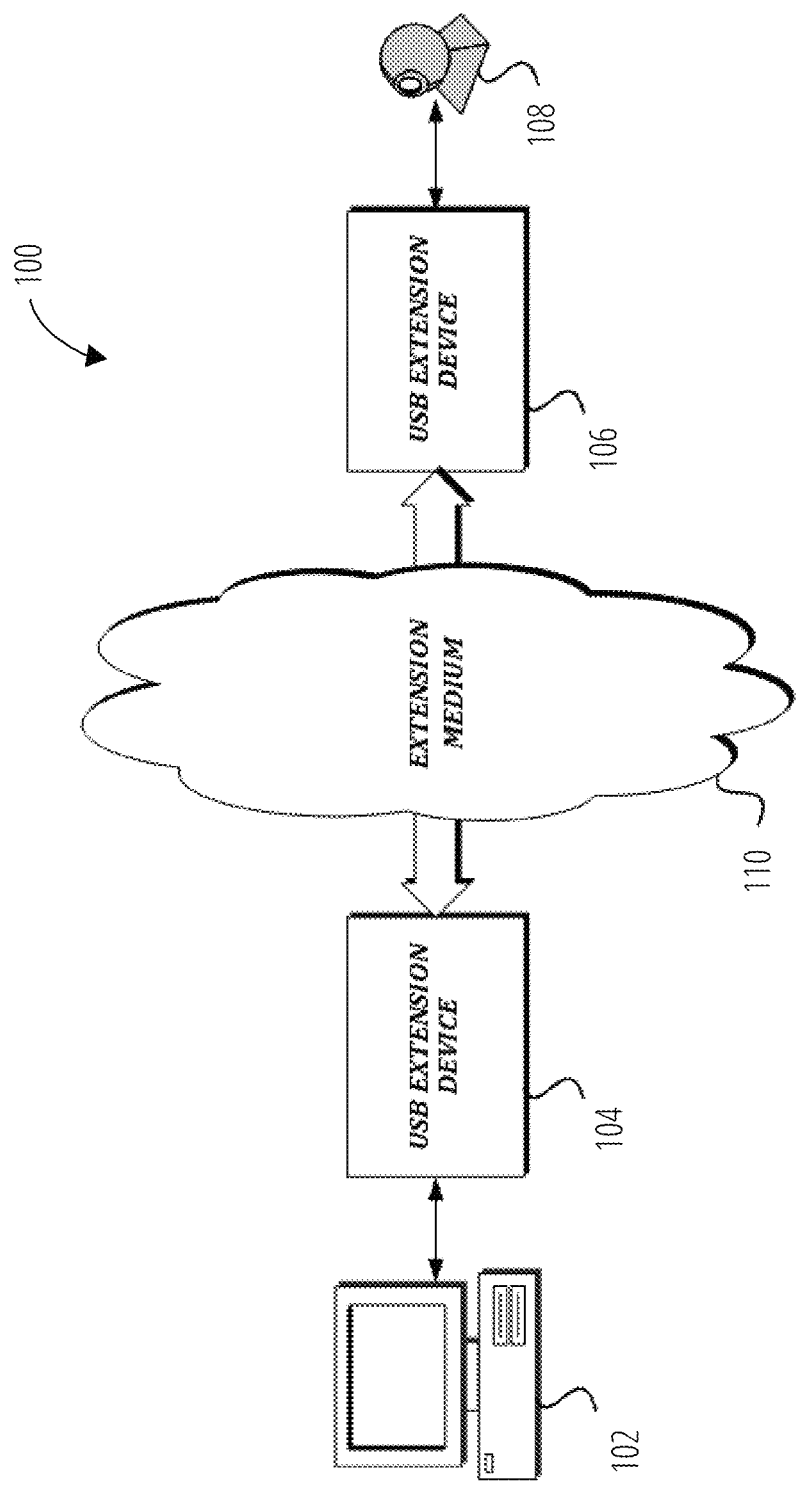
FIG. 1 is a block diagram that illustrates one embodiment of a system for extending USB communication according to various embodiments of the present disclosure

FIG. 1 is a block diagram that illustrates one embodiment of a system 100 for extending USB communication according to various embodiments of the present disclosure. The system 100 includes a host device 102 and a USB device 108. Traditionally, the host device 102 and the USB device 108 would be directly connected via a USB cable, and would communicate directly with one another via a protocol that conforms to a USB specification, such as USB 1.0, USB 1.1, USB 2.0, USB 3.0, or USB 3.1. As discussed above, such a connection would be limited to a short distance between the host device 102 and the USB device 108 due to the timing requirements of the USB specification.

The host device 102 may be any type of computing device containing a USB host controller. Some examples of suitable host devices 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller. The example illustrated in FIG. 1 is a webcam, but some other examples of suitable USB devices 108 may include, but are not limited to, a human interface device such as a keyboard or mouse, a mass storage device such as a flash drive or external hard drive, a USB-capable medical device, a printer, a USB hub, a wireless controller, and/or the like.

In the present system 100, the host device 102 is connected via a USB protocol to an upstream USB extension device 104, and the USB device 108 is connected via a USB protocol to a downstream USB extension device 106. The upstream USB extension device 104 and the downstream USB extension device 106 are communicatively coupled via an extension medium 110 such as a network that may increase the distance between the host device 102 and the USB device 108 beyond that supported by the USB specification. The extension medium 110 and communication thereon may include any suitable networking technology, such as Ethernet, Bluetooth, WiFi, WiMax, the Internet, fiber optic point-to-point transmission, and/or the like, and any suitable communication medium, such as via physical cables, via fiber optic cable, via wireless spectrum, and/or the like.

In some embodiments, the upstream USB extension device 104 and the downstream USB extension device 106 may happen to be closer to each other than the short USB requirement distance, and/or may be directly connected by a cable instead of via a network, but retain the capability of overcoming increased latency between the host device 102 and the USB device 108 that is introduced by the use of an extension medium 110 that does not comply with the USB specifications.

One feature provided by the upstream USB extension device 104 and downstream USB extension device 106 is that they hide the presence of the extension medium 110 from the host device 102 and the USB device 108. In other words, upstream USB extension device 104 and downstream USB extension device 106 handle communication over the extension medium 110 and compensate for any additional latency introduced thereby, but the host device 102 and the USB device 108 behave as if they were connected directly via a USB specification-compliant connection. Accordingly, the host device 102 and the USB device 108 can communicate via the upstream USB extension device 104 and downstream USB extension device 106 without any non-standard software or hardware re-configuration on the host device 102 or USB device 108.

Figure 2:
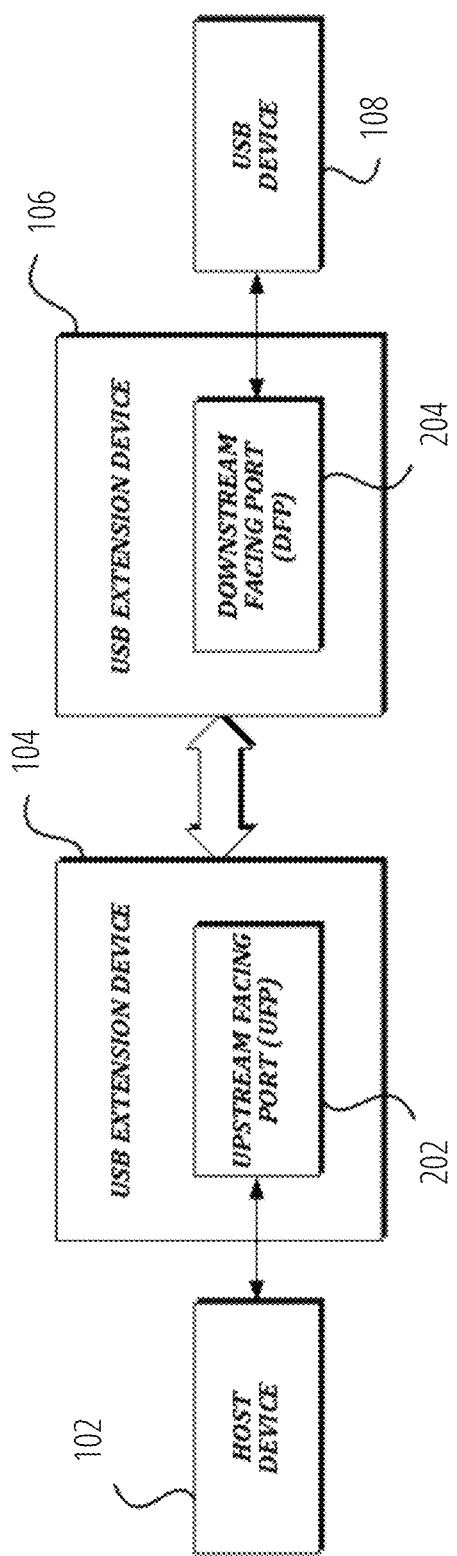
FIG. 2 is a block diagram that illustrates further details of the upstream USB extension device and downstream USB extension device illustrated in FIG. 1.

FIG. 2 is a block diagram that illustrates further details of the upstream USB extension device 104 and downstream USB extension device 106 illustrated in FIG. 1. The upstream USB extension device 104 includes an upstream facing port 202, and the downstream USB extension device 106 includes a downstream facing port 204. As used herein, the terms "upstream facing port" and the corresponding acronym "UFP" may be used interchangeably, as may the terms "downstream facing port" and the corresponding acronym "DFP." Likewise, because the upstream USB extension device 104 includes an upstream facing port 202, the upstream USB extension device 104 may also be called a "UFP device," and because the downstream USB extension device 106 includes a downstream facing port 204, the downstream USB extension device 106 may also be called a "DFP device."

The UFP device 104 is configured at least to communicate with the host device 102 via a USB-standard-compliant protocol using the upstream facing port 202, and to exchange messages and USB bus traffic with the DFP device 106 via the extension medium 110. The DFP device 106 is configured at least to communicate with the USB device 108 via a USB-standard-compliant protocol using the downstream facing port 204, and to exchange messages and USB bus traffic with the UFP device 104 via the extension medium 110. The upstream USB extension device 104 and the downstream USB extension device 106 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 2, the upstream facing port 202 of the upstream USB extension device 104 is connected to a downstream facing port of the host device 102, and the downstream facing port 204 of the downstream USB extension device 106 is connected to an upstream facing port of a USB device 108. In other embodiments, the upstream facing port 202 of the upstream USB extension device 104 may be connected to a downstream facing port other than one provided by a host device 102, such as a downstream facing port of a hub, and/or the like. Likewise, in other embodiments, the downstream facing port 204 of the downstream USB extension device 106 may be connected to an upstream facing port other than one provided by a USB device 108, such as an upstream facing port of a hub, and/or the like. The discussion below is primarily in terms of the simple topology illustrated in FIG. 2, but one of ordinary skill in the art will recognize that in some embodiments similar techniques may be used in other topologies without departing from the scope of the present disclosure.

Figure 3:
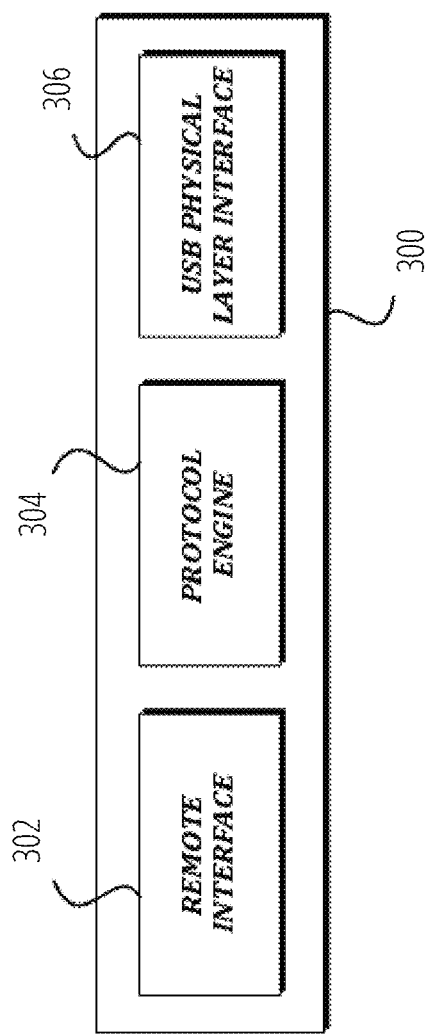
FIG. 3 is a block diagram that illustrates an exemplary embodiment of a port device according to various aspects of the present disclosure.

FIG. 3 is a block diagram that illustrates an exemplary embodiment of a port device 300 according to various aspects of the present disclosure. In some embodiments, the port device 300 may be constructed to provide services of an upstream facing port 202, and in some embodiments the port device 300 may be constructed to provide services of a downstream facing port 204. In some embodiments, the port device 300 may include instructions to provide services of both an upstream facing port 202 and a downstream facing port 204, wherein the particular port services that are provided are determined by a user configuration such as a jumper switch, a firmware setting, and/or the like.

As illustrated, the port device 300 includes a protocol engine 304, a USB physical layer interface 306, and a remote interface 302. In some embodiments, the protocol engine 304 may be configured to provide and/or execute the logic discussed below with regard to the UFP device 104 and/or the DFP device 106. The protocol engine 304 may instruct the USB physical layer interface 306 to apply the appropriate electrical signals to the USB physical layer in order to communicate with the USB device 108 or the host device 102. Likewise, the protocol engine 304 may instruct the remote interface 302 to exchange information with the remote USB extension device.

In some embodiments, the protocol engine 304 may be implemented within a logic device such as a PLD, an ASIC, a FPGA, and/or the like. In other embodiments, the protocol engine 304 may be implemented within a computing device having at least one processor and a memory containing computer-executable instructions that, if executed by the at least one processor, cause the protocol engine 304 to perform the actions discussed below; a dedicated digital hardware device implemented, for example, as a state machine configured to perform the actions described; within an application specific processor; and/or within any other suitable computing device. In some embodiments, the protocol engine 304 (or other component of the port device 300) may include a computer-readable memory usable to cache data packets, as discussed further below.

In some embodiments, logic of actions attributed to a USB extension device is executed by a protocol engine 304, which then instructs a USB physical layer interface 306 and/or a remote interface 302 to perform the appropriate communication steps associated with the logic. Throughout the discussion below, such actions may simply be described as being performed by the UFP device 104 or the DFP device 106 as if it was a single device for ease of discussion. One of ordinary skill in the art will recognize that actions attributed directly to the UFP device 104 or the DFP device 106 may actually be performed by a protocol engine 304, a USB physical layer interface 306, a remote interface 302, and/or some other component of the USB extension device.

Figure 4A:
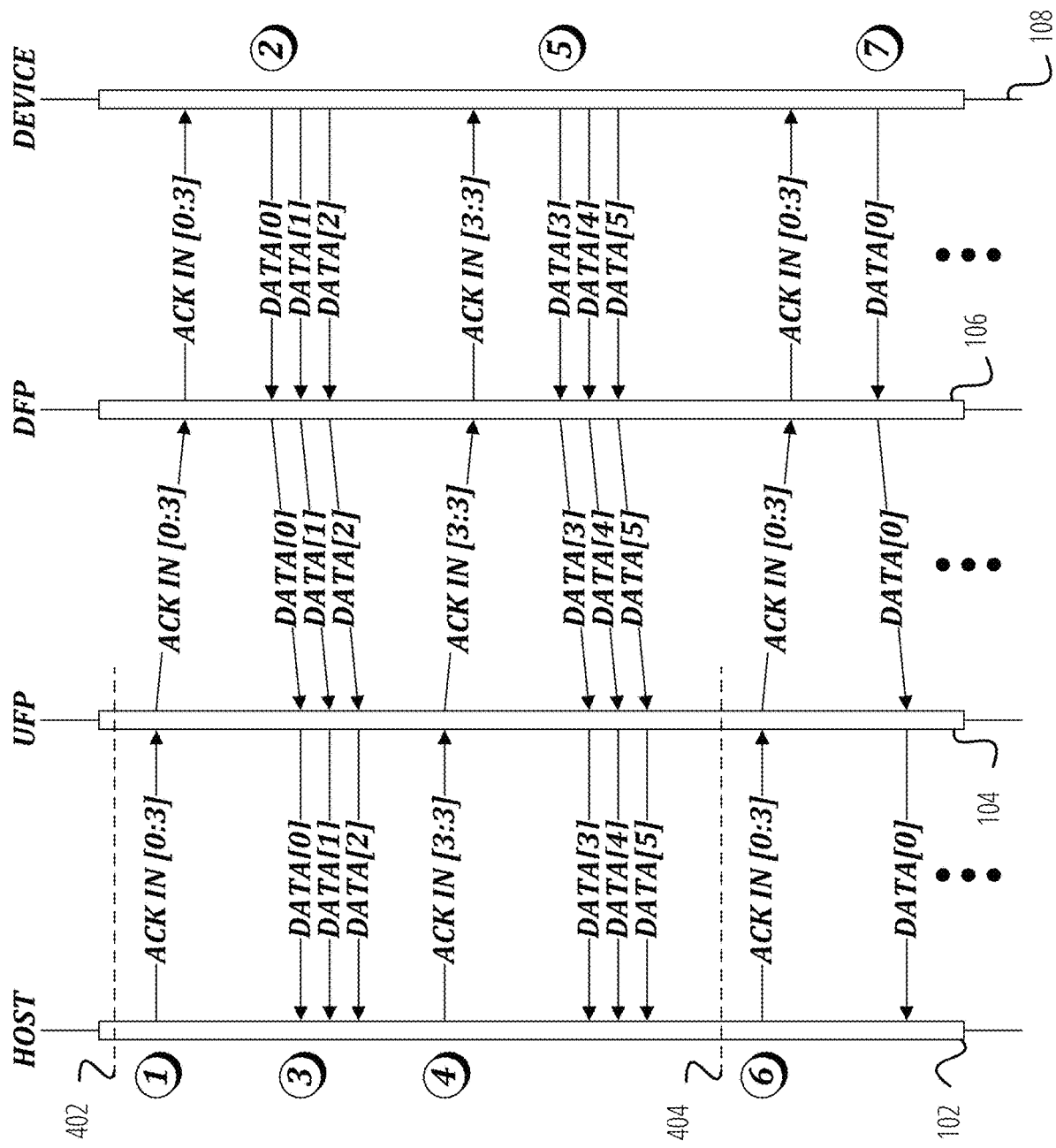
FIG. 4A is a sequence diagram that illustrates communication between a host device and a USB device in a low latency mode according to various aspects of the present disclosure.

FIG. 4A is a sequence diagram that illustrates communication between a host device 102 and a USB device 108 in a low latency mode according to various aspects of the present disclosure.

In the sequence diagram illustrated in FIG. 4A (and in the other sequence diagrams included herewith), time advances from the top of the diagram to the bottom of the diagram. Solid arrows indicate the transmission of packets generated by a host device 102 or USB device 108 according to the USB Specifications (and/or encapsulated or translated versions thereof). Dashed arrows indicate the transmission of synthetic packets generated by a UFP device 104 or a DFP device 106, either based on a packet generated by a host device 102 or USB device 108, or in response to a packet generated by a host device 102 or a USB device 108. The synthetic packets may be identical in content to the packets generated by a host device 102 or a USB device 108 but shifted in time, or may have content that is altered from the content of the packets generated by a host device 102 or a USB device 108. Horizontal arrows between separate elements indicate transmissions that comply with timing requirements of the USB Specifications, while angled arrows indicate transmissions over the extension medium 110 that may be affected by increased latency. The circled numbers refer to points in the sequence of data processing for discussion purposes.

In FIG. 4A, the illustrated communication is an isochronous IN communication, in which the host device 102 indicates that it is ready to receive data, and the USB device 108 transmits data to the host device 102. FIG. 4A illustrates the use of a UFP device 104 and a DFP device 106, in a case wherein the latency between the UFP device 104 and the DFP device 106 is low enough that the UFP device 104 and the DFP device 106 may simply convert and bridge USB physical layer signaling onto the extension medium without timing errors being introduced. In this case, the extension medium has a throughput capable of supporting a SuperSpeed connection, such as 5.0 Gbps or 10.0 Gbps. In this low latency case, the latency between the UFP device 104, the DFP device 106, and the extension medium does not impact timing parameters between the host device 102 and the USB device 108.

In SuperSpeed communication, the host device 102 schedules service intervals of, for example, 125 µs, for isochronous transactions. As described in Section 8.12.5 of the USB 3.1 Specification, the host device 102 is required to schedule transactions, including isochronous transactions, such that they do not cross these service interval boundaries. In the low-latency scenario illustrated in FIG. 4A, this may not be a problem. A first service interval boundary 402 and a second service interval boundary 404 are shown. At point 1, the host device 102 generates a request packet, such as an ACK packet, and transmits it to the UFP device 104. The ACK packet indicates a sequence number ("0") and a buffer count that indicates a number of packets that the host device 102 is ready to accept ("3"). The host device 102 may base the number of packets that it is ready to accept on a determination of whether all of the packets would be received before the next service interval boundary 404 occurs.

The UFP device 104 receives the ACK packet, and transmits it to the DFP device 106 via the extension medium. The DFP device 106 then transmits the ACK packet to the USB device 108. At point 2, the USB device 108 begins transmitting DATA packets, starting at the requested sequence number. The DATA packets are received by the DFP device 106, which forwards the DATA packets to the UFP device 104. At point 3, the UFP device 104 begins transmitting the DATA packets to the host device 102, which receives them.

At point 4, because the host device 102 is required to schedule the IN transaction such that it does not cross a service interval boundary, the host device 102 determines a number of data packets that could be received before the second service interval boundary 404 occurs. As shown, the host device 102 has determined, based on the timings specified in the USB specification, that three data packets could be requested and received before reaching the service interval boundary 404. Accordingly, the host device 102 transmits another request packet, such as an ACK packet, that indicates the next sequence number ("3") and the number of packets ("3") that it had determined could be received before the second service interval boundary 404. As before, the ACK packet is received by the UFP device 104, transmitted to the DFP device 106 over the extension medium, and then received by the USB device 108. At point 5, the USB device 108 transmits the requested data packets to the DFP device 106. The DFP device 106 transmits the requested data packets to the UFP device 104, which, in turn, transmits the requested data packets to the host device 102.

After the second service interval boundary 404, the same process occurs again: at point 6, the host device 102 transmits a request packet to the USB device 108 via the UFP device 104 and the DFP device 106, and at point 7 the USB device 108 begins transmitting responsive data packets.

One will note that the transmission of two sets of three packets is an example only, and that in some embodiments, different numbers of packets may be requested. For example, Section 8.12.6.2 of the USB 3.1 Specification indicates that a host may split a transfer into bursts of 2, 4, or 8 data packets, followed by a burst of however many packets are remaining to be requested. Accordingly, in some embodiments, to request six data packets during a service interval the host device 102 may request four data packets at point 1, and then two data packets at point 4. In practice, it has been found that host devices 102 exhibit a variety of behavior.

Figure 4B:
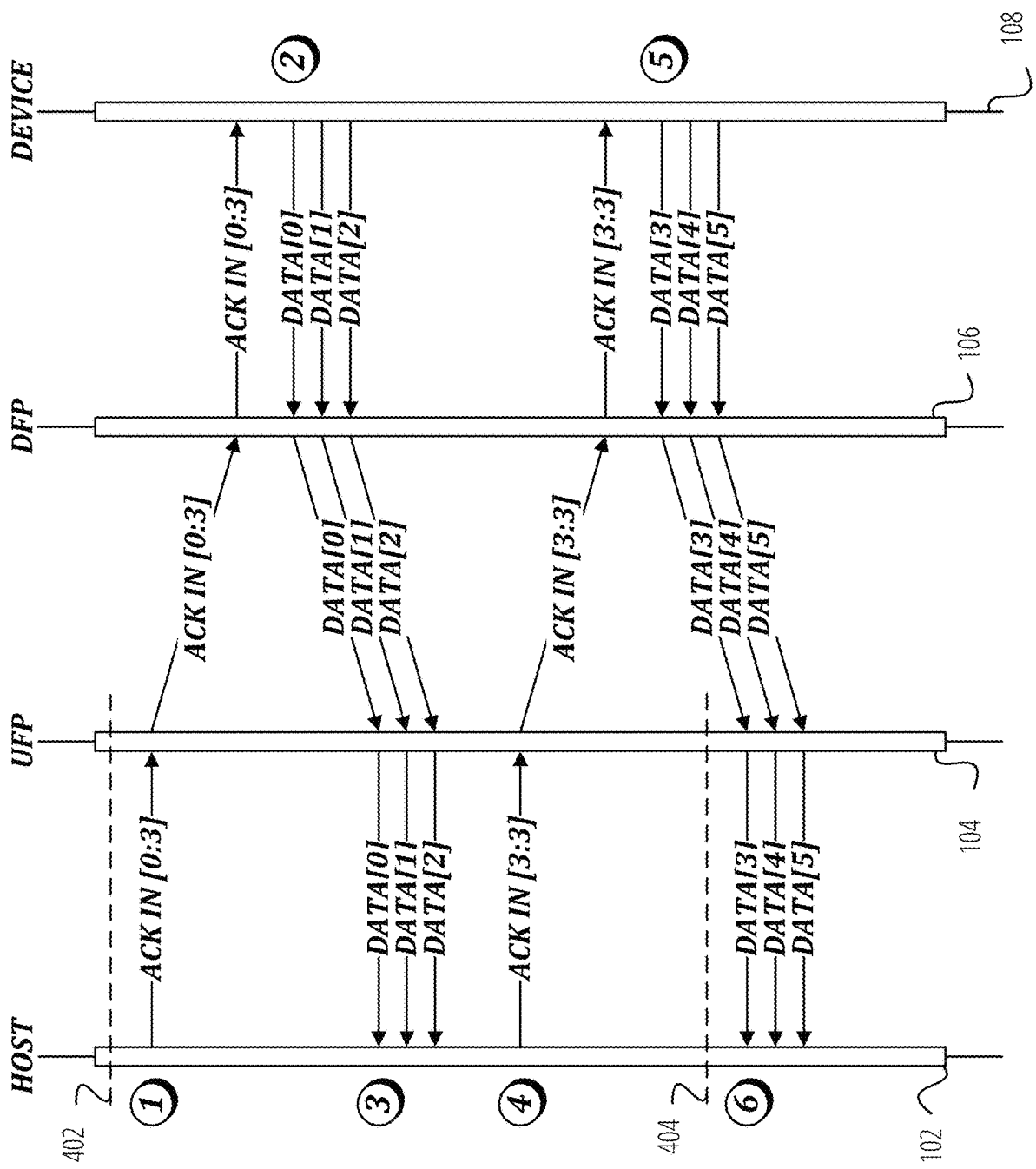
FIG. 4B is a sequence diagram that illustrates a problem in using the naïve bridging technique for isochronous IN transactions in high latency situations.

While the technique shown in FIG. 4A works in the trivial, low latency case, the inventor of the present disclosure have discovered that problems arise in high latency situations. FIG. 4B is a sequence diagram that illustrates a problem in using the naïve bridging technique for isochronous IN transactions in high latency situations. A first service interval boundary 402 and a second service interval boundary 404 are again shown. As in FIG. 4A, at point 1, the host device 102 transmits a request packet to request three data packets, which is transmitted to the USB device 108 via the UFP device 104 and the DFP device 106. At point 2, the USB device 108 begins transmitting the requested data packets back to the host device 102 via the DFP device 106 and the UFP device 104, and at point 3, the host device 102 begins receiving the data packets.

At point 4, the problems begin to become clear. As stated above, the presence of the extension medium is hidden from the host device 102, and so the host device 102 does not have the information needed to compensate for the added latency. When the host device 102 determines how many packets it can request and receive before the second service interval boundary 404 occurs, it uses the timings indicated in the USB specification to do so. Accordingly, at point 4, the host device 102 determines that, based on specification-compliant timings, it could receive three data packets before the second service interval boundary 404. So, the host device 102 transmits a request packet requesting three data packets. The request packet is transmitted to the USB device 108 via the UFP device 104 and the DFP device 106, and at point 5, the USB device 108 begins transmitting the requested data packets to the host device 102 via the DFP device 106 and the UFP device 104. Due to the added latency introduced by the extension medium, the host device 102 does not start receiving the data packets until point 6, which is after the second service interval boundary 404 has already occurred. This will cause errors in the communication between the host device 102 and the USB device 108. In some cases, these errors may manifest as the connection between the host device 102 and the USB device 108 being dropped. In some cases, the connection may not be dropped, but the errors may manifest in other ways, such as a video image provided by a camera including flicker or other unwanted artifacts.

Figure 5:
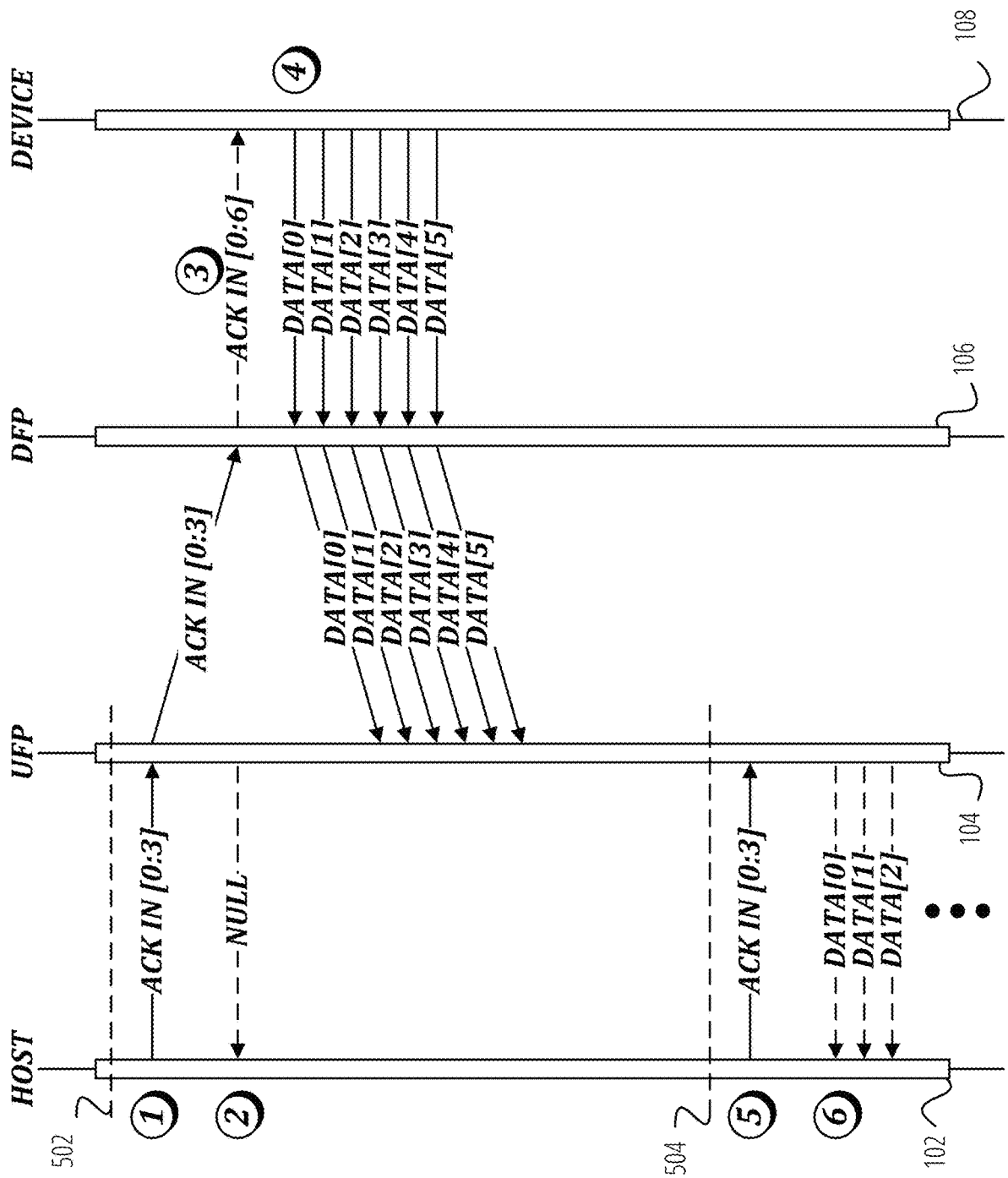
FIG. 5 is a sequence diagram that illustrates an example of a technique for compensating for latency added by the extension medium in isochronous IN transactions according to various aspects of the present disclosure.

FIG. 5 is a sequence diagram that illustrates an example of a technique for compensating for latency added by the extension medium in isochronous IN transactions according to various aspects of the present disclosure. Like in FIG. 4A and FIG. 4B, a first service interval boundary 502 and a second service interval boundary 504 are illustrated. At point 1, the host device 102 sends a request packet to the UFP device 104 that includes a sequence number ("0") and a number of packets ("3"), and the UFP device 104 transmits the request packet to the DFP device 106. At point 2, the UFP device 104 transmits a synthetic packet back to the host device 102 to place the host device 102 in a temporary waiting state. The illustrated synthetic packet is a null (NULL) packet, which may be a data packet with a zero-length payload, but any other type of packet that can place the host device 102 in a waiting state may be used. In response to receiving the NULL packet, the host device 102 enters a waiting state in which it does not re-transmit the request packet until after the second service interval boundary 504.

At point 3, the DFP device 106 sends a synthetic request packet to the USB device 108. The synthetic request packet created by the DFP device 106 includes the sequence number from the request packet transmitted by the host device 102 at point 1. However, the DFP device 106 has altered the number of packets such that it does not match the number of packets in the request packet transmitted by the host device 102 at point 1.

In some embodiments, the DFP device 106 may request a greater number of packets than were requested by the host device 102. Requesting a greater number of packets allows the DFP device 106 to receive additional data that can be sent to the UFP device 104 to respond to subsequent requests from the host device 102 without having to wait for a round-trip communication between the UFP device 104 and the DFP device 106. In some embodiments, the DFP device 106 may determine a number of packets associated with a maximum burst size value that has been configured by the host device 102 for the USB topology or for the particular USB device 108 during the initial enumeration conducted by the host device 102. The DFP device 106 may request a number of packets to correspond to the maximum burst size, regardless of whether the host device 102 requested fewer packets in its first request. This may ensure that the UFP device 104 will have all of the data that the host device 102 would request during a single service interval. A maximum number of packets that may be processed by a host device 102 during a service interval may be up to 48 for 5 Gbps communication or 96 for 10 Gbps communication. USB devices 108 are normally configured with maximum burst size values lower than these limits. A typical maximum burst size may be around 6 or 7, though values as low as 3 may be possible, as well as values as high as 12 for devices including but not limited to some high-definition cameras, or even higher for other devices.

In other embodiments, the DFP device 106 may request any number of packets that is between the number of packets requested by the host device 102 and the maximum burst size. As illustrated, the DFP device 106 has generated a synthetic packet to request six packets, instead of the three originally requested by the host device 102. This may be because the maximum burst size has been configured to be six, or for other reasons including but not limited to a configuration on the DFP device 106, a determination based on the number of packets from the original request packet, or a determination based on the amount of latency between the UFP device 104 and the DFP device 106.

At point 4, the USB device 108 transmits the requested data packets to the DFP device 106. The DFP device 106 then transmits the requested data packets to the UFP device 104. At point 5, the host device 102 determines that the second service interval boundary 504 has occurred, and so the host device 102 transmits a new request packet that may be similar to the request packet transmitted at point 1. At point 6, the UFP device 104 responds with the three data packets that had been cached on the UFP device 104. These data packets are illustrated with dashed lines and may be considered synthetic data packets because they are shifted in time by virtue of being cached by the UFP device 104.

One will recognize that the host device 102 may then transmit another request packet to request the next three data packets, and the UFP device 104 may respond with the next three data packets that had also been cached on the UFP device 104. One will note that, by pre-fetching more data than requested by the host device 102, the UFP device 104 is able to replicate the functionality described between points 1-5 of FIG. 4A, wherein a maximum amount of data can be transferred during a single service interval, even though the situation in FIG. 5 includes a high amount of latency between the UFP device 104 and the DFP device 106.

Though not illustrated in FIG. 5, in some embodiments, the DFP device 106 may generate additional synthetic request packets in order to retrieve a maximum number of DATA packets that may be retrieved from the USB device 108 during the service interval. For example, after the DFP device 106 receives the illustrated DATA[5] packet, the DFP device 106 may generate a second synthetic request packet having a synthetic sequence number based on the DATA packets already received by the DFP device 106, and a synthetic buffer count. The synthetic buffer count may be the same as the synthetic buffer count of the first synthetic request packet, or may be different. For example, the synthetic buffer count of the second synthetic request packet may be reduced to only request a number of DATA packets that can be transmitted before the expiration of the current service interval. In some embodiments, the DFP device 106 may continue to generate synthetic request packets until the USB device 108 indicates that no more DATA packets are available or until no further DATA packets can be retrieved in the current service interval. The USB device 108 may indicate that no more DATA packets are available by transmitting a DATA packet with the last packet flag (LPF) set, or by transmitting a DATA packet smaller than 1024 bytes. These additional synthetic request packets and responsive DATA packets may be transmitted in the embodiment illustrated in FIG. 5 and/or in other embodiments illustrated herein, but are not illustrated in order to avoid obscuring other inventive features of the present disclosure.

One will also note that some aspects of the technique illustrated in FIG. 5 are similar to techniques disclosed in U.S. Pat. No. 10,552,355, issued Feb. 4, 2020 (hereinafter "the '355 patent"). However, the techniques illustrated in FIG. 5 are nevertheless distinguishable. For example, instead of having the synthetic packet generated by the UFP device 104 as disclosed in the '355 patent, the present disclosure describes the synthetic packet being generated by the DFP device 106. It has been found that allowing the DFP device 106 instead of the UFP device 104 to control the number of data packets requested from the USB device 108 allows for a more robust extension environment with better reliability and throughput at least because the DFP device 106 is able to obtain more timely status information from the USB device 108 due to its USB standard-compliant connection thereto.

Figure 6:
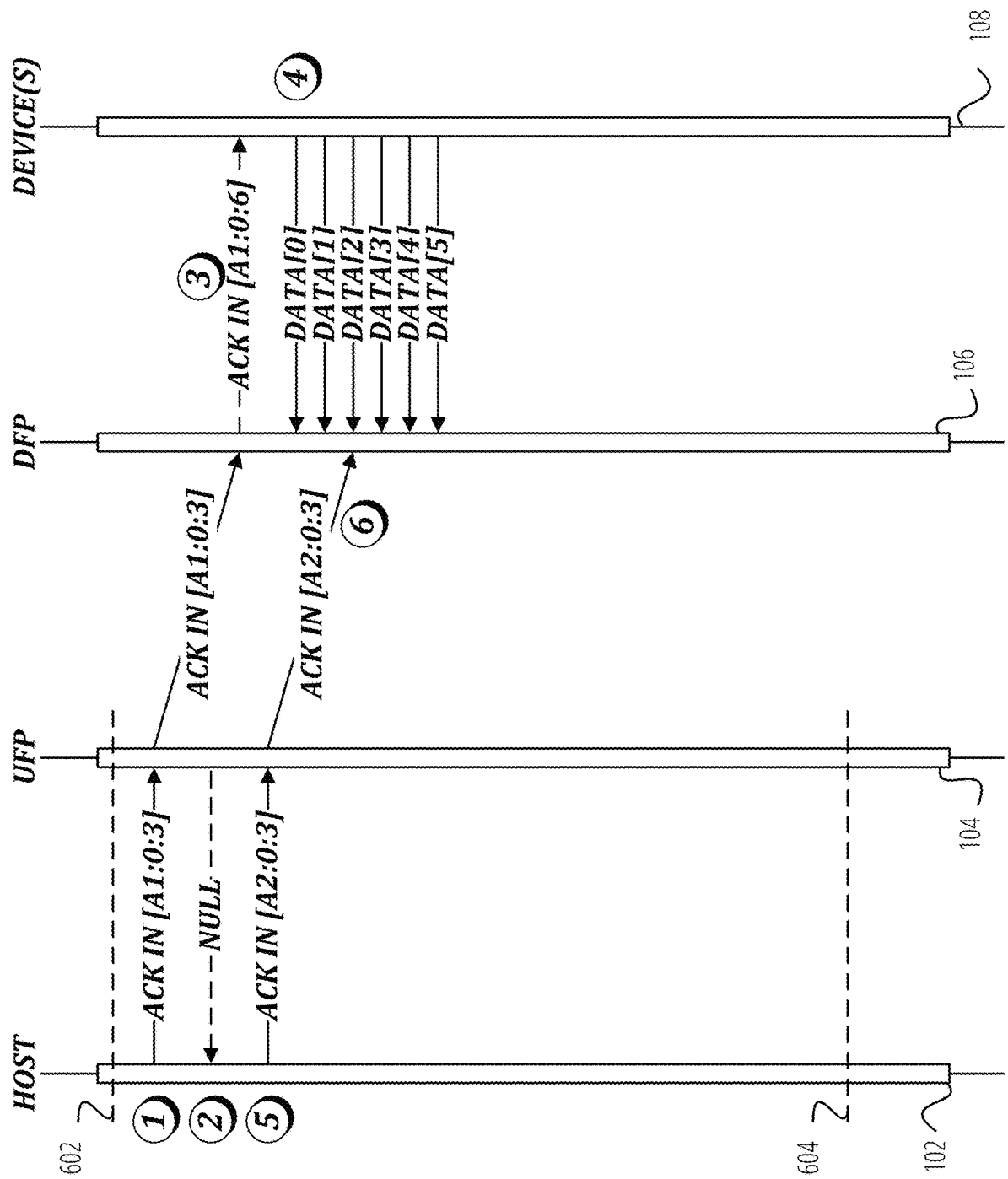
FIG. 6 is a sequence diagram that illustrates a problem in using the technique of FIG. 5 to overcome latency issues in an extension environment with multiple concurrently active USB endpoints.

While the techniques disclosed in FIG. 5 are useful in communication topologies having a single active USB endpoint, it has been found by the inventor of the present application that additional problems may arise if more than one USB endpoint is concurrently active. FIG. 6 is a sequence diagram that illustrates a problem in using the technique of FIG. 5 to overcome latency issues in an extension environment with multiple concurrently active USB ISO IN endpoints.

In FIG. 6, a host device 102, UFP device 104, and DFP device 106 are illustrated similar to those illustrated and discussed above. The USB device 108 illustrated in FIG. 6 may represent multiple USB devices 108 with concurrent active endpoints, or may represent a single USB device 108 with multiple concurrent active endpoints.

A service interval starts at first service interval boundary 602, and at point 1, the host device 102 generates a request packet, such as an ACK packet, and transmits it to the UFP device 104. The UFP device 104, in turn, transmits the request packet to the DFP device 106. The ACK packet indicates a target endpoint ("A1"), a sequence number ("0"), and a number of packets that the host device 102 is ready to accept ("3"). As discussed above, at point 2, the UFP device 104 responds to the host device 102 with a NULL packet. At point 3, the DFP device 106 generates a synthetic request packet to request a greater number of packets from the USB device 108, and at point 4, the USB device 108 begins transmitting the requested packets to the DFP device 106.

At point 5, problems start to be introduced. In the single endpoint scenario illustrated in FIG. 5, the host device 102 would wait until after the second service interval boundary 604 to submit another request packet to the single endpoint. However, with more than one concurrent active endpoint, once the host device 102 receives the NULL packet in response to the first request packet, the host device 102 may determine whether it could issue another request to a different endpoint that could be fulfilled before the second service interval boundary 604. Accordingly, at point 5, the host device 102 generates a second request packet, such as the illustrated ACK packet directed to endpoint "A2," and transmits it to the UFP device 104. Endpoint A2 may be a different endpoint provided by the USB device 108 that provides endpoint A1, or may be an endpoint provided by a different USB device 108. One will recognize that the particular endpoint identifiers "A1" and "A2" are used as non-limiting examples only, and that in some embodiments, different or additional endpoint identifiers may be used.

At point 6, the DFP device 106 receives the second request packet from the UFP device 104. However, at point 6, the DFP device 106 is busy receiving the response packets from the A1 endpoint, and the receipt of the second request packet conflicts with the servicing of these packets. What is needed are techniques to address these conflicts to allow multiple concurrent endpoints to operate in an extension environment.

Figure 7:
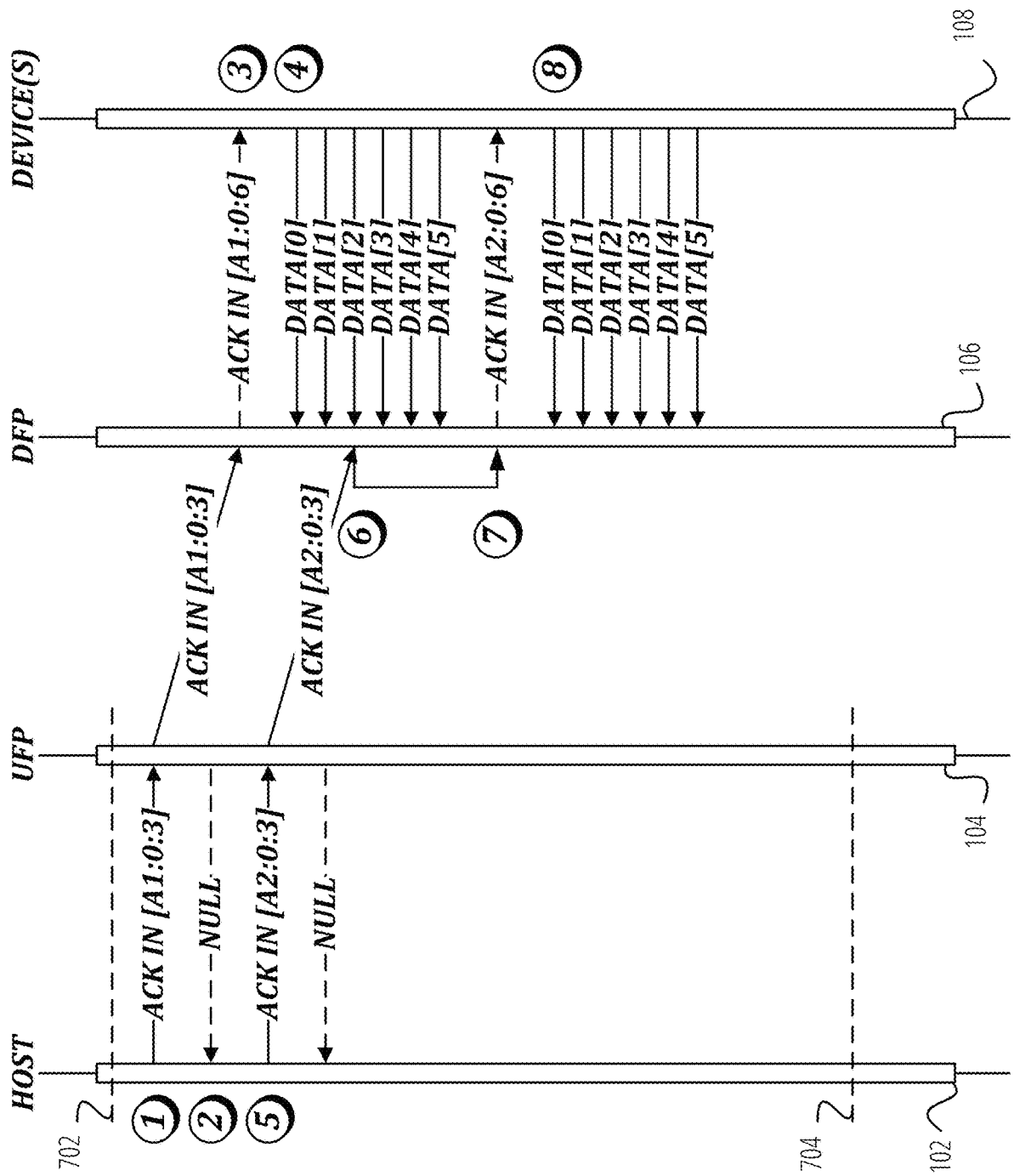
FIG. 7 is a sequence diagram that illustrates a non-limiting example embodiment of a technique for servicing multiple concurrent endpoints in an extension environment according to various aspects of the present disclosure.

FIG. 7 is a sequence diagram that illustrates a non-limiting example embodiment of a technique for servicing multiple concurrent endpoints in an extension environment according to various aspects of the present disclosure. In the technique illustrated in FIG. 7, the DFP device 106 is configured to properly handle a second request packet received while processing a first request packet.

Similar to the description above, a service interval starts with a first service interval boundary 702, and at point 1, the host device 102 generates a first request packet (such as the illustrated ACK IN packet) and transmits it to the UFP device 104. The first request packet is addressed to endpoint A1, identifies sequence number 0, and requests 3 packets. At point 2, the UFP device 104 finds that it is not storing packets that can be used to provide a full response to the first request packet, and so the UFP device 104 transmits a synthetic NULL packet in response to the first request packet. The synthetic NULL packet will cause the host device 102 to attempt to retry the request for packets identified in the first request packet at a later time.

At point 3, the DFP device 106 receives the first request packet, generates a first synthetic request packet based on the first request packet, and transmits the first synthetic request packet to a USB device 108 associated with endpoint A1. At point 4, the USB device 108 associated with endpoint A1 begins transmitting DATA packets responsive to the first synthetic request packet to the DFP device 106. As illustrated in FIG. 5, the DFP device 106 transmits the responsive DATA packets to the UFP device 104 to be stored for responding to a subsequent request packet. This transmission also occurs in the technique illustrated in FIG. 7, but it is not illustrated in order to avoid obscuring the inventive features of the present disclosure.

At point 5, the host device 102 determines that a response to a second request packet addressed to a different endpoint (endpoint A2) could be processed before the second service interval boundary 704. Accordingly, the host device 102 transmits a second request packet (such as the illustrated ACK IN packet) to the UFP device 104. The second request packet is addressed to endpoint A2, identifies sequence number 0, and requests 3 packets. The UFP device 104 determines that it is not storing packets that can be used to respond to the second request packet, and so the UFP device 104 transmits a synthetic NULL packet in response to the second request packet. Again, the synthetic NULL packet will cause the host device 102 to attempt to retry the request for packets identified in the second request packet at a later time.

At point 6, the DFP device 106 receives the second request packet from the UFP device 104. Because the DFP device 106 is currently processing the DATA packets transmitted by the endpoint A1, it is unable to transmit the second request packet. Accordingly, at point 6, the DFP device 106 stores the second request packet in temporary storage of the DFP device 106 until the DFP device 106 detects that the USB connection between the DFP device 106 and the USB devices 108 is free to service the second request packet (or a second synthetic packet based on the second request packet).

At point 7, the DFP device 106 has detected that the USB bus is available to service a second synthetic request packet. Any suitable technique may be used by the DFP device 106 to detect that the USB bus is available. In some embodiments, the DFP device 106 determines the timing of point 7 based on its monitoring of the USB connection between the DFP device 106 and the USB devices 108. For example, in some embodiments, the DFP device 106 may detect receipt of a DATA packet from the endpoint A1 that has a last packet flag (LPF flag) set to detect when the processing of the first synthetic request packet has completed. The DFP device 106 may then determine whether enough time remains in a current service interval on the connections between the DFP device 106 and the USB devices 108 to service the second request packet. In some embodiments, the DFP device 106 may generate the second synthetic request packet to request the smaller of a maximum burst size of packets that can be provided by endpoint A2, or a number of packets that may be retrieved from endpoint A2 within a current service interval.

Accordingly, at point 7, the DFP device 106 generates and transmits the second synthetic request packet to endpoint A2. At point 8, endpoint A2 transmits responsive DATA packets to the DFP device 106, which are then transmitted (not illustrated) to the UFP device 104 to be used to respond to a subsequent request packet from the host device 102.

By the end of the sequence illustrated in FIG. 7, the UFP device 104 has received 6 packets from endpoint A1 and 6 packets from endpoint A2. In a subsequent service interval, the host device 102 may generate similar request packets in order to retry requesting the originally requested packets. The UFP device 104 will then be able to service those requests from the packets stored by the UFP device 104, thus overcoming both the latency in the extension medium 110 between the UFP device 104 and the DFP device 106, and the conflict the synthetic NULL packets cause between the first request packet and the second request packet.

An embodiment wherein the UFP device 104 is not storing packets at point 2 is illustrated in FIG. 7 for ease of discussion. In other embodiments, the UFP device 104 may be storing packets responsive to the first request packet and may transmit the packets to the host device 102 instead of transmitting the ACK packet to the DFP device 106 and transmitting the synthetic NULL packet to the host device 102 at point 2. If enough time remains before the second service interval boundary 704, the host device 102 may proceed to point 5 and the conflict resolution techniques illustrated from point 6 to point 8 may still occur if the DFP device 106 is still receiving DATA packets responsive to a previous request packet.

FIG. 7 illustrates a conflict that occurs between a first request packet that is an ISO ACK IN packet and a second request packet that is an ISO ACK IN packet. In some embodiments, similar techniques may be used for conflicts between a first request packet that is an ISO ACK IN packet and a second request packet that is a SETUP DP packet, a Control ACK IN packet, an INTERRUPT IN packet, or a BULK streaming PRIME packet. That is, second request packets of those types will also be stored by the DFP device 106 if there is a conflict, and will be transmitted to the target endpoint once the USB bus becomes available.

Figure 8:
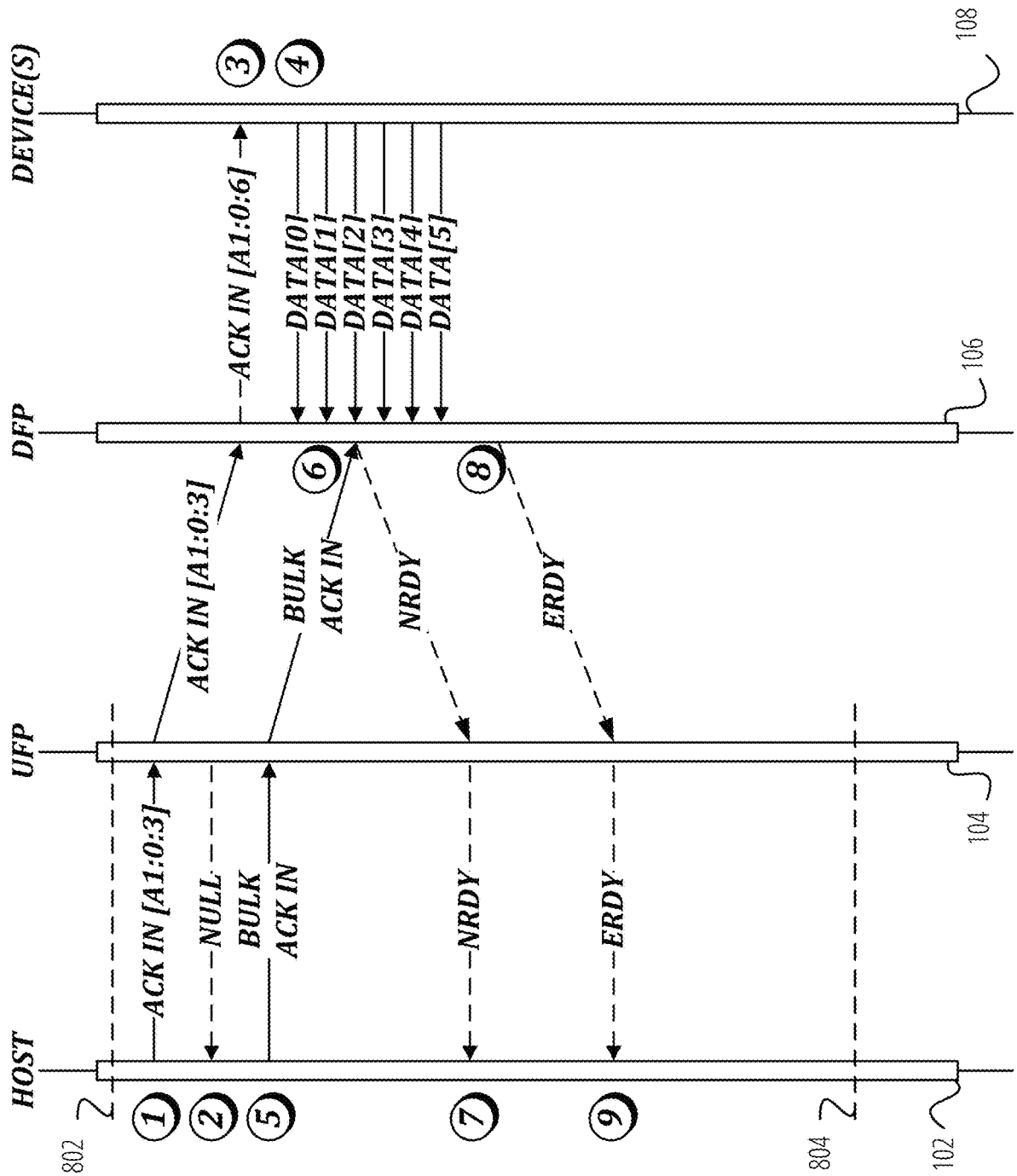
FIG. 8 illustrates a non-limiting example embodiment of a technique for handling a conflict that occurs between a first request packet that is an ISO ACK IN packet and a second request packet that is a BULK ACK IN packet according to various aspects of the present disclosure.

FIG. 8 illustrates a non-limiting example embodiment of a technique for handling a conflict that occurs between a first request packet that is an ISO ACK IN packet and a second request packet that is a BULK ACK IN packet according to various aspects of the present disclosure. The technique in FIG. 8 is described for a second request packet that is a BULK ACK IN packet, but it may also be used as an alternative technique for processing a second request packet that is an INTERRUPT IN packet.

In FIG. 8, a service interval is illustrated between a first service interval boundary 802 and a second service interval boundary 804. At point 1, the host device 102 generates a first request packet directed to endpoint A1, and transmits the first request packet to the UFP device 104. The processing of the first request packet from point 1 to point 4 is similar to that discussed above in FIG. 7, and so is not described again here for the sake of brevity.

At point 5, the host device 102 generates a second request packet that is a BULK ACK IN packet, and transmits the BULK ACK IN packet to the UFP device 104. In some embodiments, the BULK ACK IN packet may be directed to the same endpoint as the first request packet, while in some embodiments, the BULK ACK IN packet may be directed to a different endpoint.

At point 6, the DFP device 106 receives the BULK ACK IN packet from the UFP device 104 while it is processing DATA packets from endpoint A1. The DFP device 106 detects that the USB bus is busy processing those DATA packets. The DFP device 106 responds by transmitting a synthetic NRDY packet to the UFP device 104, which the UFP device 104 transmits to the host device 102 at point 7. The DFP device 106 may store the BULK ACK IN packet in local storage, or may simply store an indication that the BULK ACK IN was received and had a conflict.

At point 8, the DFP device 106 has detected that the USB bus is available to process the BULK ACK IN packet. This may be done in any suitable way, including but not limited to using the techniques discussed above (such as detecting a DATA packet with an LPF flag set or having fewer than 1024 bytes). Instead of transmitting a synthetic version of the BULK ACK IN packet to the USB device 108 as with the other techniques illustrated and discussed above, at point 8, the DFP device 106 transmits a synthetic ERDY packet to the UFP device 104, which is in turn transmitted to the host device 102 at point 9. At point 8, the DFP device 106 may discard the stored version of the BULK ACK IN packet (or the indication of the receipt of the BULK ACK IN packet). The host device 102 will then resend the BULK ACK IN according to the USB specification.

Though the above figures illustrate problems that occur when the host device 102 attempts to send request packets while the UFP device 104 and DFP device 106 are processing an ACK IN packet, processing of some other types of packets by the UFP device 104 and DFP device 106 may also lead to problems that can be overcome with similar techniques. For example, FIG. 9 illustrates a non-limiting example embodiment of a technique for handling a conflict that occurs between a first request packet that is a BULK ACK IN packet and a second request packet according to various aspects of the present disclosure.

Figure 9:
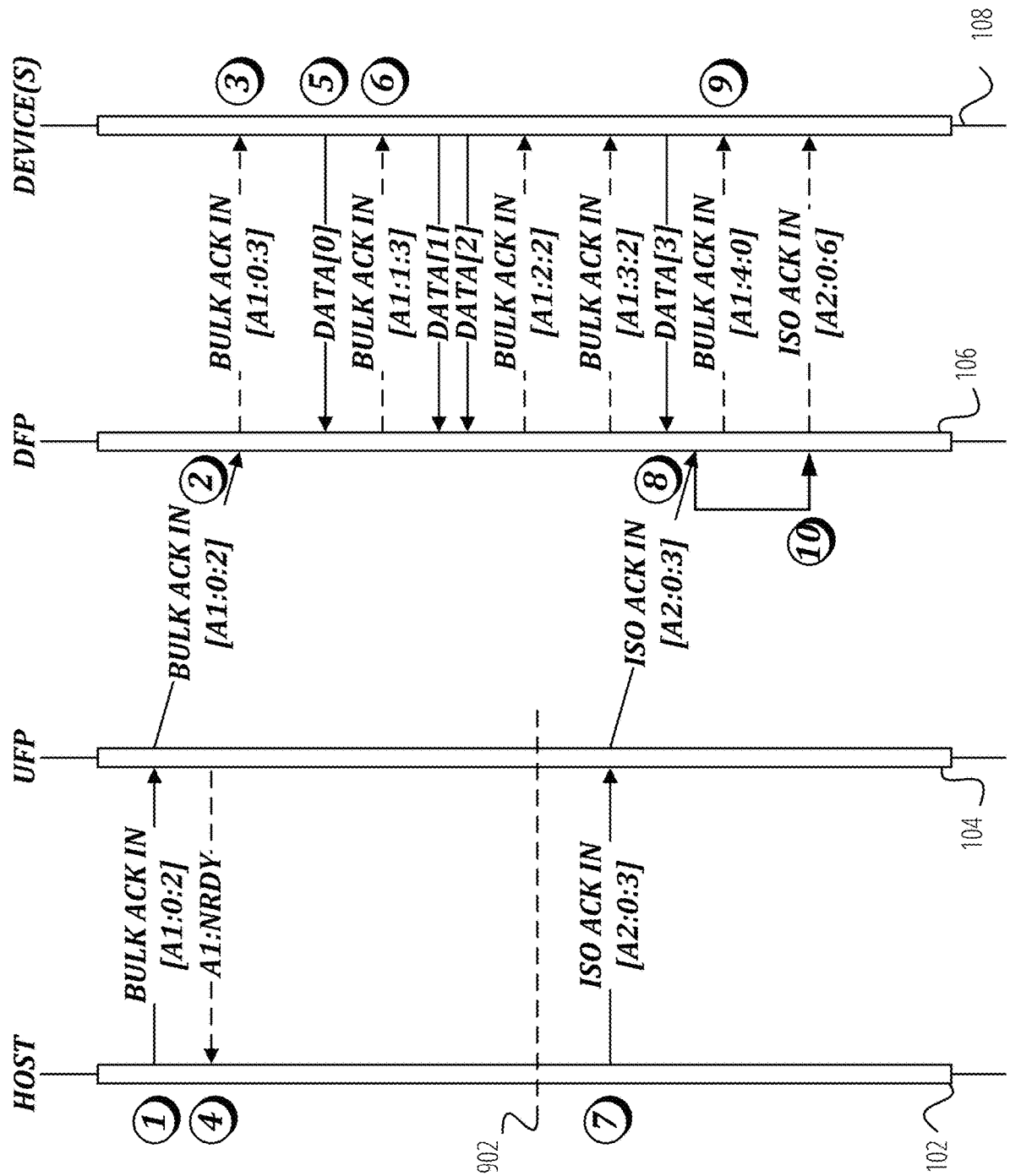
FIG. 9 illustrates a non-limiting example embodiment of a technique for handling a conflict that occurs between a first request packet that is a BULK ACK IN packet and a second request packet according to various aspects of the present disclosure.

In FIG. 9, at point 1, the host device 102 generates a BULK ACK IN packet, and transmits the BULK ACK IN packet to the UFP device 104. Similar to the ISO ACK IN packets illustrated above, the BULK ACK IN packet identifies a target endpoint ("A1"), a sequence number ("0"), and a desired number of packets ("2"). In some embodiments, the desired number of packets may be larger than 2.

At point 2, the DFP device 106 receives the BULK ACK IN packet from the UFP device 104. The DFP device 106 generates a first synthetic BULK ACK IN packet based on the BULK ACK IN packet that requests additional packets from endpoint A1, similar to the additional request of packets illustrated above. The USB device 108 receives the first synthetic BULK ACK IN packet at point 3. Because the UFP device 104 was not storing any packets responsive to the BULK ACK IN packet, the UFP device 104 generates a synthetic NRDY packet at point 4 to cause the host device 102 to wait.

At point 5, endpoint A1 transmits the first DATA packet responsive to the first synthetic BULK ACK IN packet to the DFP device 106. At point 6, the DFP device 106 responds with a second synthetic BULK ACK IN packet acknowledging the received DATA packet, and the DFP device 106 and endpoint A1 continue to exchange DATA packets and synthetic BULK ACK IN packets to attempt complete the transaction.

Meanwhile, a service interval boundary 902 between the host device 102 and the UFP device 104 occurs, and at point 7, the host device 102 generates a new request packet for ISO IN endpoint A2. At point 8, the DFP device 106 receives the new request packet, and stores it for later processing., similar to the techniques discussed above for storing packets for later processing. However, in order to prioritize the ISO ACK IN packet, at point 9 the DFP device 106 transmits a synthetic flow control packet to endpoint A1 that acknowledges receipt of the most recent DATA packet and instructs endpoint A1 to stop sending further DATA packets by providing a burst size of zero. At point 10, the DFP device 106 generates a synthetic request packet based on the stored request packet, and transmits it to endpoint A2 for normal processing as described above.

Figure 10:
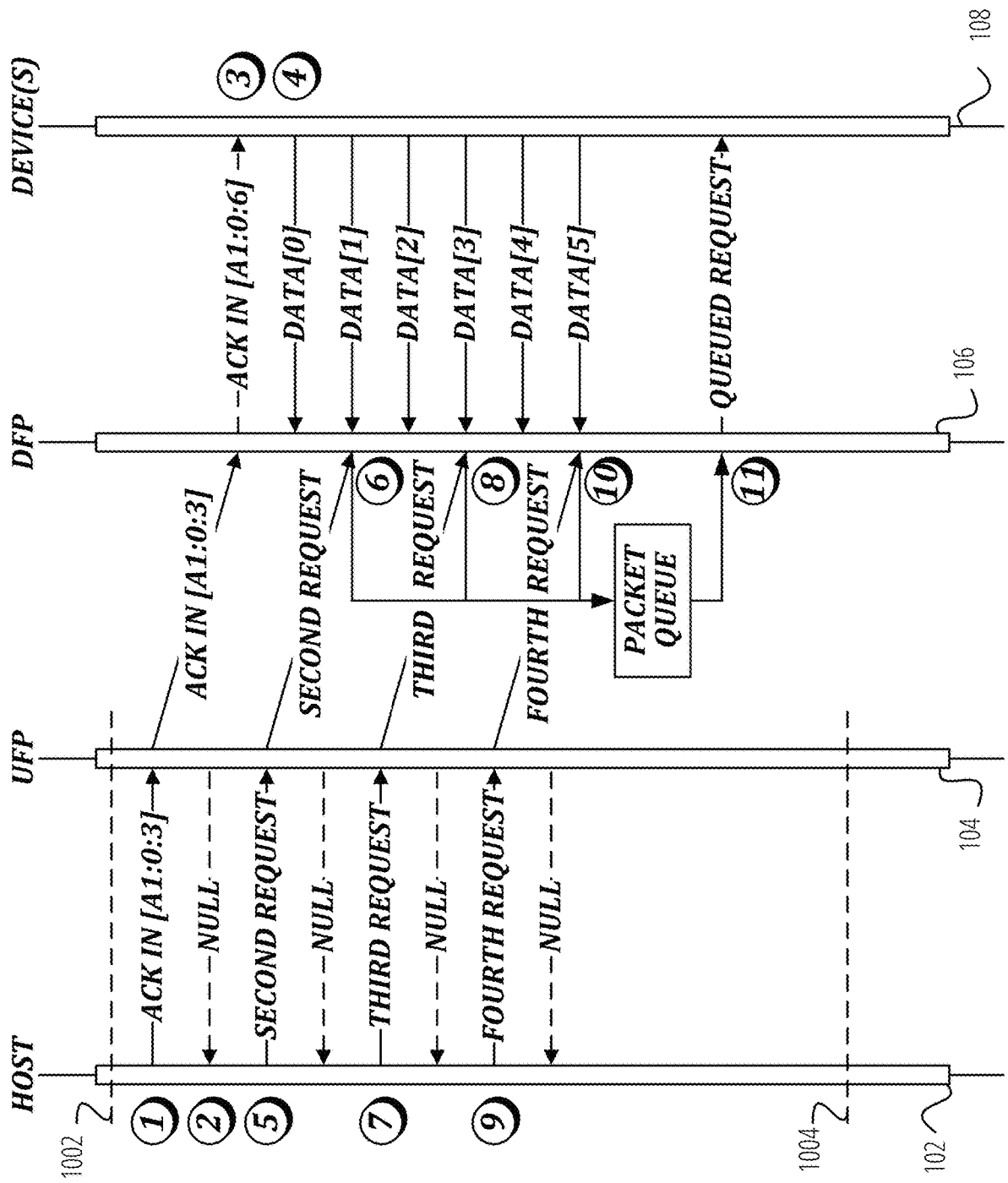
FIG. 10 is a sequence diagram that illustrates a non-limiting example embodiment of a technique for handling multiple conflicting packets according to various aspects of the present disclosure.

The techniques for handling conflicting request packets illustrated in FIG. 7-FIG. 9 are relatively simple for the sake of discussion, in that they illustrate and describe the handling of a single conflicting request packet. In some embodiments, the host device 102 may generate multiple conflicting request packets which are handled by some embodiments of the present disclosure. FIG. 10 is a sequence diagram that illustrates a non-limiting example embodiment of a technique for handling multiple conflicting packets according to various aspects of the present disclosure. Though request packets are illustrated and described, one will note that other packets (such as OUT packets) may be processed using this technique, as described below.

FIG. 10 illustrates a service interval between a first service interval boundary 1002 and a second service interval boundary 1004. At point 1, the host device 102 generates an initial request packet (in this case, an ACK IN packet similar to those illustrated in FIG. 6-FIG. 8). At point 2, the UFP device 104 responds with a NULL packet, at point 3, the USB device 108 receives a synthetic request packet generated by the DFP device 106 based on the initial request packet, and at point 4, the USB device 108 begins transmitting responsive DATA packets to the DFP device 106. Points 1-4 in FIG. 10 are similar to points 1-4 illustrated and described above in FIG. 6-FIG. 8, and so are not described again here for the sake of brevity.

At point 5, the host device 102 generates a second request packet and transmits it to the UFP device 104. The UFP device 104 responds to the second request packet with a NULL packet, and transmits the second request packet to the DFP device 106. At point 6, the DFP device 106 receives the second request packet, determines that the USB bus is occupied with processing the response to the synthetic request packet, and stores the second request packet in local storage on the DFP device 106 for later processing. Points 5 and 6 are similar to points 5 and 6 illustrated in FIG. 7 and discussed above.

At point 7, the host device 102 generates a third request packet and transmits it to the UFP device 104. The UFP device 104 again responds to the third request packet with a NULL packet, and transmits the third request packet to the DFP device 106. Again, at point 8, the DFP device 106 receives the third request packet, determines that the USB bus is occupied with processing the response to the synthetic request packet, and stores the third request packet in local storage on the DFP device 106 for later processing. The actions at point 7 to point 8 are again similar to points 5 and 6. Similar actions are again repeated at point 9 and point 10, as the host device 102 generates a fourth request packet, the UFP device 104 responds with another NULL packet, and transmits the fourth request packet to the DFP device 106 where it is stored.

Any suitable data structure may be used by the DFP device 106 to store the second request packet, the third request packet, and the fourth request packet. In some embodiments, the local storage used by the DFP device 106 to hold the second request packet, the third request packet, and the fourth request packet may be a first-in, first-out (FIFO) packet queue, such that the conflicting packets are processed by the DFP device 106 in the order in which they are received. Another non-limiting example of a suitable data structure for providing local storage of the packets on the DFP device 106 is a state table.

In some embodiments, more complicated processing may be performed by the DFP device 106 to prioritize certain types of requests over others. For example, in some embodiments, the DFP device 106 may sort the packet queue based on a priority order, such that the packets are selected to be removed from the packet queue first in their priority order, and then according to arrival time. In some embodiments, instead of resorting the packet queue, separate FIFO queues may be maintained for each different type of prioritized packet, and a higher-priority queue may be emptied before moving on to a lower-priority queue. In some embodiments, OUT packets (or other packets that flow from the host device 102 to the USB device 108 and do not fall into the other categories listed below) may be the most highly prioritized packets from the packet queue, followed by ISO packets, next followed by CONTROL packets, next followed by BULK STREAM packets, next followed by INTERRUPT IN packets, and finally followed by BULK packets. While other prioritization orders may be used, this particular prioritization order has been empirically determined to provide the highest robustness and reliability of the connection between the host device 102 and the USB devices 108 in the extension environment.

At point 11, the DFP device 106 detects that the USB bus is available to service a saved request packet (as discussed above). Accordingly, the DFP device 106 selects a queued request packet from the packet queue (as also discussed above), removes the queued request packet from the packet queue, and transmits a synthetic queued request packet to the USB device 108 based on the selected queued request packet. After processing of the synthetic queued request packet (not illustrated) is complete and the DFP device 106 detects that the USB bus is again available, the DFP device 106 selects a second queued request packet from the packet queue and repeats these actions for the second queued request packet. These actions may repeat until the packet queue is empty.

FIG. 10 illustrates processing of simple request packets as illustrated in FIG. 7 and described above for the sake of simplicity. In some embodiments, one or more of the second request packet, the third request packet, and the fourth request packet may be an INTERRUPT ACK IN request packet, which may be processed as described above with respect to FIG. 8, with the local storage at the DFP device 106 occurring in the packet queue as described in FIG. 10. Likewise, in some embodiments, the initial request packet may be a BULK ACK IN packet as illustrated in FIG. 9, in which case the initial request packet would be processed as illustrated in FIG. 9. Further, though three request packets are illustrated in FIG. 10, one will recognize that more or fewer conflicting request packets may be generated and processed by embodiments of the present disclosure, including a number of BULK STREAM, CONTROL, or BULK request packets where some may be processed in a subsequent service interval.

The above drawings also assume that the UFP device 104 is not storing any packets that can be used to answer any of the conflicting request packets, so that the unique features of the present disclosure may be shown. In some embodiments, the UFP device 104 may already be caching packets responsive to one of or more of the conflicting request packets. In such cases, the UFP device 104 may transmit the appropriate DATA packets to the host device 102 instead of transmitting the request packet to the DFP device 106, as illustrated in FIG. 5 after the second service interval boundary 504.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. A system for communicating USB information via an extension medium, the system comprising:
an upstream facing port device (UFP device) communicatively coupled to a host device via a USB-compliant connection;
a downstream facing port device (DFP device) communicatively coupled to a USB device via a USB-compliant connection and communicatively coupled to the UFP device via a non-USB extension medium;
wherein the DFP device is configured to:
receive, from the UFP device via the extension medium, a request packet, wherein the request packet is directed to a first endpoint and indicates a sequence number and a buffer count, and wherein the sequence number and the buffer count identify a first set of requested data packets;
generate a synthetic request packet, wherein the synthetic request packet includes the sequence number and a synthetic buffer count, wherein the sequence number and the synthetic buffer count identify a second set of requested data packets that includes the first set of requested data packets and additional data packets; and
transmit the synthetic request packet to the USB device.

2. The system of claim 1, wherein generating the synthetic request packet includes determining the synthetic buffer count based on a maximum burst size value associated with the first endpoint.

3. The system of claim 1, wherein the synthetic request packet is a first synthetic request packet, and wherein the DFP device is further configured to:
in response to determining that further data packets can be retrieved from the first endpoint before an end of a current service interval, generate a second synthetic request packet without having received an additional request packet from the UFP device, wherein the second synthetic request packet has a synthetic sequence number based on the sequence number and the synthetic buffer count of the first synthetic request packet.

4. The system of claim 3, wherein determining that further data packets can be retrieved from the first endpoint before the end of the current service interval includes determining that no data packets have been received from the first endpoint that have a last packet flag (LFP) set or that have a size less than 1024 bytes.

5. The system of claim 3, wherein the DFP device is further configured to continue transmitting synthetic request packets to the first endpoint until a data packet with a last packet flag (LPF) set is received, until a data packet smaller than 1024 bytes is received, or until no further data packets can be received before the end of the current service interval.

6. The system of claim 1, wherein the UFP device is configured to:
receive the request packet from the host device; and
transmit a synthetic response packet to the host device to cause the host device to wait for the first set of requested data packets.

7. The system of claim 6, wherein the synthetic response packet is a NULL packet.

8. A method of enabling communication between a host device and at least one USB device via a non-USB extension medium, the method comprising:
receiving, by a downstream facing port device (DFP device) from an upstream facing port device (UFP device) via the non-USB extension medium, a request packet, wherein the request packet is directed to a first endpoint and indicates a sequence number and a buffer count, and wherein the sequence number and the buffer count identify a first set of requested data packets;
generating, by the DFP device, a synthetic request packet, wherein the synthetic request packet includes the sequence number and a synthetic buffer count, wherein the sequence number and the synthetic buffer count identify a second set of requested data packets that includes the first set of requested data packets and additional data packets; and
transmitting, by the DFP device, the synthetic request packet to the USB device.

9. The method of claim 8, wherein generating the synthetic request packet includes determining the synthetic buffer count based on a maximum burst size value associated with the first endpoint.

10. The method of claim 8, wherein the synthetic request packet is a first synthetic request packet, and wherein the method further comprises:
in response to determining that further data packets can be retrieved from the first endpoint before an end of a current service interval, generating a second synthetic request packet without having received an additional request packet from the UFP device, wherein the second synthetic request packet has a synthetic sequence number based on the sequence number and the synthetic buffer count of the first synthetic request packet.

11. The method of claim 10, wherein determining that further data packets can be retrieved from the first endpoint before the end of the current service interval includes determining that no data packets have been received from the first endpoint that have a last packet flag (LFP) set or that have a size less than 1024 bytes.

12. The method of claim 10, further comprising continuing to transmit synthetic request packets to the first endpoint until a data packet with a last packet flag (LPF) set is received, until a data packet smaller than 1024 bytes is received, or until no further data packets can be received before the end of the current service interval.

13. A downstream facing port device (DFP device), comprising:
a USB downstream-facing port configured to be communicatively coupled to one or more USB devices; and
an extension interface configured to be communicatively coupled to an upstream facing port device (UFP device) via a non-USB extension medium;
wherein the DFP device is configured to:
receive, from a UFP device via the non-USB extension medium, a request packet, wherein the request packet is directed to a first endpoint and indicates a sequence number and a buffer count, and wherein the sequence number and the buffer count identify a first set of requested data packets;
generate a synthetic request packet, wherein the synthetic request packet includes the sequence number and a synthetic buffer count, wherein the sequence number and the synthetic buffer count identify a second set of requested data packets that includes the first set of requested data packets and additional data packets; and
transmit the synthetic request packet to the USB device.

14. The DFP device of claim 13, wherein generating the synthetic request packet includes determining the synthetic buffer count based on a maximum burst size value associated with the first endpoint.

15. The DFP device of claim 13, wherein the synthetic request packet is a first synthetic request packet, and wherein the DFP device is further configured to:
   in response to determining that further data packets can be retrieved from the first endpoint before an end of a current service interval, generate a second synthetic request packet without having received an additional request packet from the UFP device, wherein the second synthetic request packet has a synthetic sequence number based on the sequence number and the synthetic buffer count of the first synthetic request packet.

16. The DFP device of claim 15, wherein determining that further data packets can be retrieved from the first endpoint before the end of the current service interval includes determining that no data packets have been received from the first endpoint that have a last packet flag (LFP) set or that have a size less than 1024 bytes.

17. The DFP device of claim 15, wherein the DFP device is further configured to continue transmitting synthetic request packets to the first endpoint until a data packet with a last packet flag (LPF) set is received, until a data packet smaller than 1024 bytes is received, or until no further data packets can be received before the end of the current service interval.

* * * * *